(12) United States Patent
Emerson et al.

(10) Patent No.: US 6,173,341 B1
(45) Date of Patent: Jan. 9, 2001

(54) SYSTEM AND METHOD FOR CONFIGURING ADAPTERS IN A COMPUTER SYSTEM

(75) Inventors: Theodore F. Emerson, Houston; Christopher J. McCarty, Spring, both of TX (US)

(73) Assignee: Compaq Computer Corporation, Houston, TX (US)

(*) Notice: Under 35 U.S.C. 154(b), the term of this patent shall be extended for 0 days.

(21) Appl. No.: 09/140,040

(22) Filed: Aug. 26, 1998

(51) Int. Cl.$^7$ .............................. G06F 13/00; G06F 3/00
(52) U.S. Cl. .............................. 710/8; 710/10; 710/102; 710/104; 710/103
(58) Field of Search .................... 710/10, 8, 12, 710/101, 102, 103, 104

(56) References Cited

U.S. PATENT DOCUMENTS 5,848,249 * 12/1998 Garbus et al. ..................... 710/128
6,003,097 * 12/1999 Richman et al. ..................... 710/8

OTHER PUBLICATIONS

Mendel, Brett; "Server I/O all set to flow"; *Lantimes*, Oct. 27, 1997, vol. 14, Issue 22; cover p. and p. 31.
Briggs, Chris; "Smarter and Faster I/O for Servers"; CORE: Operating Systems; *Byte*, May 1, 1996, vol. 2, No. 5.
Thompson, Tom; "$I_2$ O Beats I/O Bottlenecks"; *Byte*, Aug. 1997, pp. 85, 86 and 3 additional pages.
$I_2$ O Introduction; Technology Backgrounder; Aug. 13, 1997; http://www.i2osig.org/Architecture/TechBack.html.
i960® RP I/O Processor—the $I_2$ O SIG site; http://134.134.214.1/design/iio/i2osig.html; Feb. 6, 1998.
"Welcome to the $I_2$ O SIG® Web Site!"; http://www.i2osig.org; Feb. 6, 1998.
"About $I_2$O Technology"; http://www.i2osig.org/Architecture;Feb. 6, 1998.
"Technology Backgrounder"; http://www/i2osig.org/Architecture/TechBack.html; Feb. 6, 1998; 4 pages.
"Questions and Answers"; http://www/i2osig.org/Architecute/QandA.html; Feb. 6, 1998; 4 pages.
"$I_2$O ® Specifications For Non–Members"; http://www.i2osig.org/Architecture/GetSpec.html; Feb. 6, 1998.
Amdahl, Carlton G.; "$I_2$ O Future Directions"; http://www.i2osig.org; Jun. 1996; 12 pages.

(List continued on next page.)

*Primary Examiner*—Ario Etienne
(74) *Attorney, Agent, or Firm*—Fletcher, Yoder & Van Someren (57) ABSTRACT

A computer system with an Intelligent Input/Output architecture having a plug-and-play control mechanism for assigning and controlling one or more adapters. The computer system comprises at least one host processor for executing a host operating system, the host processor disposed on a host bus, an input/output (I/O) bus operably coupled to the host bus via a host-to-bus bridge, and a plurality of peripheral devices or adapters operably connected to the I/O bus for transferring data in I/O transactions controlled by an IOP resource. Initially, a selected adapter is defaulted to an "assigned" state without changing the interrupt routing associated with the adapter. Upon detecting the presence of a driver module that is executable on the IOP, the assigned adapter is marked as "controlled" and the interrupt routing is configured to deliver interrupts to the IOP. Subsequently, the controlled adapter is rendered "hidden" from the host operating system.

24 Claims, 5 Drawing Sheets

OTHER PUBLICATIONS

Goble, Scott, et al.: "Intelligent I/O Architecture"; http://www.i2osig.org; Jun. 1996, 22 pages.

"Press Releases and Clips"; http://www.i2osig.org/Press; Feb. 6, 1998; 4 pages.

Listing of Press Releases ; http://altavista.digital.com/cgi-bin/quer . . . =21% 2FMar%2F86&d1=&search.x=46&search.y=6; Feb. 6, 1998; 2 pages.

Crothers, Brooke; "Intel server chip gets big backing", Oct. 7, 1997; http://www.news.com/News/Item/0,4,14962,00.html; Feb. 6, 1998.

"HP Demonstrates Commitment to $I_2O$ Standard With New I2O Disk–array Controller"; *Hewlett Packard*; Press Release, Atlanta, Oct. 8, 1997; http://hpcc920.external.hp.com/oct97/08oct97b.html; Feb. 6, 1998; 2 pages.

"$I_2O$: Disaster in the making for the freeware community"; http://22.kenandted.com/i2o/disaster.html; Feb. 6, 1998; 2 pages.

* cited by examiner

| ADAPTERS ENUMERATED | 302 ADAPTER_STATE | | | |
|---|---|---|---|---|
| | 304 ASSIGN (A) | 306 PRESENT (P) | 308 CONTROLLED (C) | 310 HIDDEN (H) |
| 312-1 A1 | | | | |
| 312-2 A2 | | | | |
| ⋮ | | | | |
| 312-N AN | | | | |

SYSTEM AND METHOD FOR CONFIGURING ADAPTERS IN A COMPUTER SYSTEM

BACKGROUND OF THE INVENTION

1. Field of the Invention

The present invention relates to computer systems with novel input-output (I/O) architectures, and more particularly, and not by way of limitation, to a plug-and-play control mechanism for assigning and controlling one or more adapters.

2. Description of Related Art

A conventional computer system typically includes one or more central processing units (CPUs) capable of executing algorithms and one or more memory subsystems. Computer systems also include peripheral devices, or, peripherals, for inputting and outputting data. Some common peripheral devices include, for example, monitors, keyboards, printers, modems, hard disk drives, floppy disk drives, and network controllers. As known in the art, peripheral devices may be conveniently categorized into several classes based on their functionality. For example, the "block storage device" class of peripherals may include hard disk drives, whereas the "Local Area Network (LAN) ports" class may include LAN controllers, such as, for example, Ethernet controllers. The various components of a computer system communicate and transfer data using a bus system which is connected to the communicating components.

One of the key factors in the performance of a computer system is the speed at which the CPU operates. Generally, the faster the CPU operates, the faster the computer system can complete a designated task. Another method of increasing the speed of a computer system is using multiple CPUs, commonly known as multi-processing. With multiple CPUs, algorithms required to complete a task can be executed substantially in parallel as opposed to their sequential execution.

However, the addition of a faster CPU or additional CPUs can result in different increases in performance among different computer systems. Although it is the CPU that executes the algorithms required for performing a designated task, in many cases, it is the peripherals that are responsible for providing data to the CPU and storing or outputting the processed data from the CPU. When a CPU in operation attempts to read or write to a peripheral, the CPU often "sets aside" the algorithm which it is currently executing and is diverted to executing the read/write transaction (also referred to as an Input/Output transaction, or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction process associated therewith would create a bottleneck in the overall performance of the computer system. As the CPU becomes faster, the amount of time executing algorithms becomes less of a limiting factor compared to the time expended in performing an I/O transaction. Accordingly, the improvement in the performance of the computer system that could theoretically result from the use of a faster CPU or the addition of another CPU may become substantially curtailed by the bottleneck created by I/O transactions. Moreover, it can be readily appreciated that any performance degradation due to such I/O bottlenecks in a single computer system may have a stifling effect on the overall performance of a computer network in which the computer system is disposed.

Operating peripheral devices in association with a computer system typically requires a piece of executable code, known commonly as a device driver. Because peripherals are often manufactured separately from the CPU, the operation of a peripheral is generally effectuated by a unique device driver associated with the specific peripheral. The device driver, which controls the peripheral, is an executable computer program that is executed by the CPU and must be compatible with the particular operating system (OS) of the computer system. It can be readily seen that because device drivers are unique to both operating systems as well as peripherals, a considerable number of device drivers are typically required to support the numerous possible combinations of peripherals and operating systems. Accordingly, it can be appreciated that the ensuing device driver proliferation thwarts the objective of device driver portability in the design of cross-platform computer system architectures.

Based on the foregoing discussion, it should be appreciated that current computer systems with a conventional I/O architecture utilizing device drivers described above suffer from a lack of device driver portability and performance constraints due to I/O bottlenecks. In order to address these shortcomings, an alternative I/O architecture—commonly known as the Intelligent Input/Output ($I_2O$) architecture—has been developed in the computer industry. Because the teachings of the present invention may be better described in relation to the $I_2O$ architecture, a brief overview thereof is provided hereinbelow.

Essentially, the $I_2O$ architecture uses a "split driver" model which inserts a messaging layer between the portion of the device driver specific to the operating system and the portion of the device driver specific to the peripheral device. It should be appreciated that in the parlance of the $I_2O$ architecture, a peripheral device is also sometimes referred to as an adapter. Accordingly, henceforth, these two terms would be used somewhat interchangeably.

The messaging layer splits the single device driver of today into two separate modules—an Operating System Service Module (OSM) and a Downloadable Driver Module (DDM). The only interaction one module has with another module is through this messaging layer which provides the communication means.

The OSM comprises the portion of the device driver that is specific to the operating system. The OSM interfaces with the operating system of the computer system (which may also be referred to in the art as the "host operating system") and is executed by the host CPU or processor. Typically, a single OSM may be used to service a specific class of peripherals or adapter. For example, one OSM would be used to service all block storage devices, such as hard disk drives and CD-ROM drives. The DDM provides the peripheral-specific portion of the device driver that understands how to interface to the particular peripheral hardware. To execute the DDM, an $I_2O$ Input/Output Processor (IOP) is added to the computer system. A single IOP may be associated with multiple peripherals, each controlled by a particular DDM, and containing its own operating system such as, for example, the $I_2O$ Real-Time Operating System (iRTOS). The DDM directly controls the peripheral, and is executed by the IOP under the management of the iRTOS.

Those skilled in the art will recognize that a DDM may typically comprise a Hardware Device Module (HDM) that directly interfaces with the peripheral and is responsible for its control and data transfer associated therewith. DDMs can also comprise an Intermediate Service Module (ISM) which is an additional software interface to the HDM. The ISM is often used for filtering, encoding, and decoding messages to the HDM.

In general operation, the communication model used in the I₂O architecture is a message passing system. When the CPU seeks to read or write to an adapter or peripheral in an I₂O system, the host operating system makes what is known as a "request". The OSM translates the request by the host operating system and, in turn, generates a message. The OSM sends the message across the messaging layer to the DDM associated with the peripheral which processes it appropriately to achieve a result. Upon completion of the processing, the DDM sends the result back to the OSM by sending an appropriate message through the messaging layer. It can be appreciated that to the host operating system, the OSM appears just like any other device driver.

By executing the DDM on the IOP, the time-consuming portion of transferring information from and to the peripheral hardware is off-loaded from the CPU to the IOP. With this off-loading, the CPU is no longer diverted for inordinate amounts of time during an I/O transaction. Moreover, because the IOP is a hardware component essentially dedicated to the processing of the I/O transactions, the problem of I/O bottlenecks is mitigated.

The I₂O architecture also significantly reduces the number of device drivers written on the basis of the split driver model. Typically, peripheral device manufacturers need only write a single DDM for a particular peripheral which can now operate with any host operating system. The vendors of the host operating system need only write one OSM for each class of peripherals, e.g., the network controller class.

One of the goals of the I₂O architecture is to allow standard "non-intelligent" or "semi-intelligent" peripheral devices to be controlled by a generic I₂O IOP resource (for example, an I₂O "accelerator" card) that could be added to a computing system. If the IOP contains the necessary software to control a particular peripheral device, the device may be abstracted through the IOP to "look" like an intelligent I₂O peripheral or adapter.

According to the I₂O architecture's specification, an IOP can control two types of adapters: hidden and system. A hidden adapter is typically one that does not appear in the system's configuration, I/O or memory address space. Such an adapter will not be seen by legacy configuration software. A system adapter, typically, is one that can appear in the system's address space, but may be controlled by the IOP. Since the device is visible to system software, care must be taken to prevent such software from interfering with control software running on the IOP.

Furthermore, it can be appreciated that in current technologies adapters or adapter slots/locations are also commonly categorized into two groups based on their topological arrangement. At present, two common architecture types are prevalent in computer systems. In one type, the system may typically comprise a primary I/O bus (such as, e.g., a Peripheral Component Interconnect bus, or, PCI bus) that is bridged to a 1S secondary I/O bus (such as, e.g., a PCI bus). In a second type, the system may comprise peer-level I/O buses bridged to a host bus, wherein additional I/O buses may be hierarchically coupled via suitable bridges to the peer-level buses. Moreover, in either architectural types, the bus bridging devices may typically comprise an IOP. Accordingly, it should be understood that adapter slots/locations may be conveniently referenced with respect to the location of the IOP/bridge device. For example, adapters or adapter locations/slots provided on a bus segment that is positioned in front of an IOP/bridge ("primary-side" bus) may be generally referred to as "primary-side" or "front-side" adapters or locations. Similarly, adapters or locations disposed on a bus segment that is positioned behind the IOP/bridge ("secondary-side" bus) may be termed as "secondary-side" or "back-side" adapters or locations.

In order for the IOP to control an adapter, two conditions are generally required. First, the adapter must be assigned to the IOP. Secondly, the IOP must contain a suitable DDM/HDM for the assigned device. Typically, if both of these conditions are met, the device is under IOP control. In current systems, the assignment characteristics, inter alia, of adapters or slots are typically defined in a non-volatile data construct (called "Hardware Resource Table" or "HRT") associated with the IOP. It can be readily appreciated that typically the assignment state of an adapter/slot may be, accordingly, remembered across boots once it is defined or programmed. However, at the first instance of system initialization (that is, when an IOP resource is initally added to the system), the contents of the HRT are unknown and the adapter assignment, therefore, is undefined and somewhat ambiguous. Typically, secondary-side or back-side adapters or locations (that is, adapters behind the IOP) are designated upon system initialization as "assigned" to the IOP resource. Similarly, primary-side or front-side adapters or locations are designated as "unassigned". Such default treatment of the adapter slots/locations may be overridden by setting a switch in the iRTOS.

Typically, in current systems, when an adapter is marked as "assigned" by setting an appropriate bit or flag in the HRT, interrupts from the device are routed to the IOP, whether or not the IOP is loaded with a suitable driver module therefor. Only when a suitable driver module is found for the adapter, it will be controlled by the IOP. It can be appreciated that in ideal situations adapters should not be assigned to the IOP unless the IOP is capable of controlling them. Currently, the front-side adapters are defaulted to the "unassigned" state and host configuration software would then use a procedure (for example, the ExecAdapterAssign procedure) for adapters that have suitable driver modules on the IOP.

There are several shortcomings in this approach which give rise to various performance costs and constraints. First, current solutions for "designing around" the initial default treatment of adapters/slots is extremely cumbersome and non-intuitive. For example, there is no simple way for the host to determine which adapters an IOP is capable of controlling and which adapters it is not, since, that determination is typically done by the IOP and not the host. To circumvent this situation, the host would first have to assign an adapter/slot to the IOP and then look to see if it was controlled. If it was not, for some reason—e.g., lack of a suitable DDM/HDM—the host would have to release that adapter/slot. Typically, this procedure needs to be done every time a DDM was downloaded, of which again, the host has no knowledge. Essentially, the system ROM would have to enumerate every adapter/slot controllable by the IOP, assign it to the IOP, retrieve the updated HRT to see if the adapter was a controlled adapter (that is, controlled by the IOP), and unassign or release it if it wasn't. It can be readily appreciated that while this procedure might work, it is highly cumbersome and not user-friendly. Moreover, in spite of the workability of this solution, there is no efficient and effective method to force adapters that are capable of being controlled from not being automatically assigned to the IOP (that is, although the IOP may contain a driver for an adapter, the user may not want the IOP to control it).

Also, if any assignment changes were necessary subsequently, the ROM would have to force a system reset since controlled adapters must be hidden to prevent non-I₂O aware host drivers from contending with the device. While an adapter can be assigned manually through an appropriate configuration procedure (for example, the IOPSETUP procedure) this requires the user to pick from a list of devices identified only by their BUS ID (e.g., PCI ID). Again, it should be appreciated that such procedures are unwieldy, awkward and non-intuitive from a user's perspective.

SUMMARY OF THE INVENTION

The present invention overcomes the above-identified problems as well as other shortcomings and deficiencies of the existing technology by providing a "plug-and-play" control method for assigning and controlling one or more adapters in an $I_2O$ system. Preferably, the adapters are defaulted to an "assigned" state although interrupts are not routed to the IOP resource and no changes in the hardware configuration of the system are effectuated. Essentially, the adapters are treated as "controllable" by the IOP. Once an appropriate driver object is found, a "controllable" adapter then becomes a "controlled" adapter and the interrupts therefrom are routed to the IOP.

In one embodiment, the present invention is directed to a computer system which comprises at least one host processor for executing a host operating system, the host processor disposed on a host bus, an input/output (I/O) bus operably coupled to the host bus via a host-to-bus bridge, and a plurality of peripheral devices or adapters operably connected to the I/O bus for transferring data in I/O transactions controlled by an IOP resource. Initially, all adapters on a bus segment (for example, adapters disposed on a bus segment located in front of the IOP resource) are defaulted to an "assigned" state without changing the interrupt routing associated with the adapters. Upon detecting the presence of a driver module that is executable on the IOP, the assigned adapter is marked as "controlled" and the interrupt routing is configured to deliver interrupts to the IOP. Subsequently, the controlled adapter is rendered "hidden" from the host operating system.

In one aspect, the present invention is also directed to a method for managing one or more adapters in a computer system having a host processor and an IOP, comprising the steps of: defaulting to a condition, upon system initialization, wherein a selected one of the one or more adapters is treated as "assigned" and further wherein the interrupt routing associated with the selected adapter remains undisturbed pursuant to the defaulting step; setting a marker associated with the selected adapter to indicate that it is "assigned"; detecting the presence of an executable driver object associated with the selected adapter; and marking the selected adapter as "controlled", based on the detecting step, such that the selected adapter is controlled by the IOP, wherein the interrupt routing associated with the selected adapter is configured to be routed to the IOP.

In a further aspect, the present invention is drawn to a system for managing one or more adapters in a computer having a host processor and an IOP, comprising: means for defaulting to an "assigned" is condition pertaining to a selected one of the one or more adapters, the means responsive to system initialization, whereby an interrupt routing means associated with the selected adapter remains undisturbed; nonvolatile means for storing a plurality of conditions associated with the one or more adapters, the plurality of conditions comprising at least the "assigned" condition, which condition is identified by the contents of a portion of the nonvolatile means; detecting means for detecting the presence of an executable driver object associated with the adapter; and means for marking the selected adapter as "controlled" when the executable driver object is detected, such that the assigned adapter is controlled by the IOP, wherein the interrupt routing means associated with the selected adapter is configured to route interrupts to the IOP.

In a still further aspect, the present invention relates to a "plug-and-play" method for assigning and controlling one or more adapters in a computer system, which computer system includes a host processor, an IOP, and an I/O bus with one or more slots, the slots associated with the adapters, the method comprising: defaulting to an "assigned" condition with respect to the one or more slots upon system initialization; determining if there is an adapter located at the slot; determining if a driver module is available for the adapter, the driver module adapted to be executable on the IOP; marking the adapter as "controlled" if the driver module is determined to be available; configuring the interrupt routing associated with the adapter such that it is routed to the IOP; and hiding the adapter from the host processor.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

The innovative teachings of the present application will be described with particular reference to numerous exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
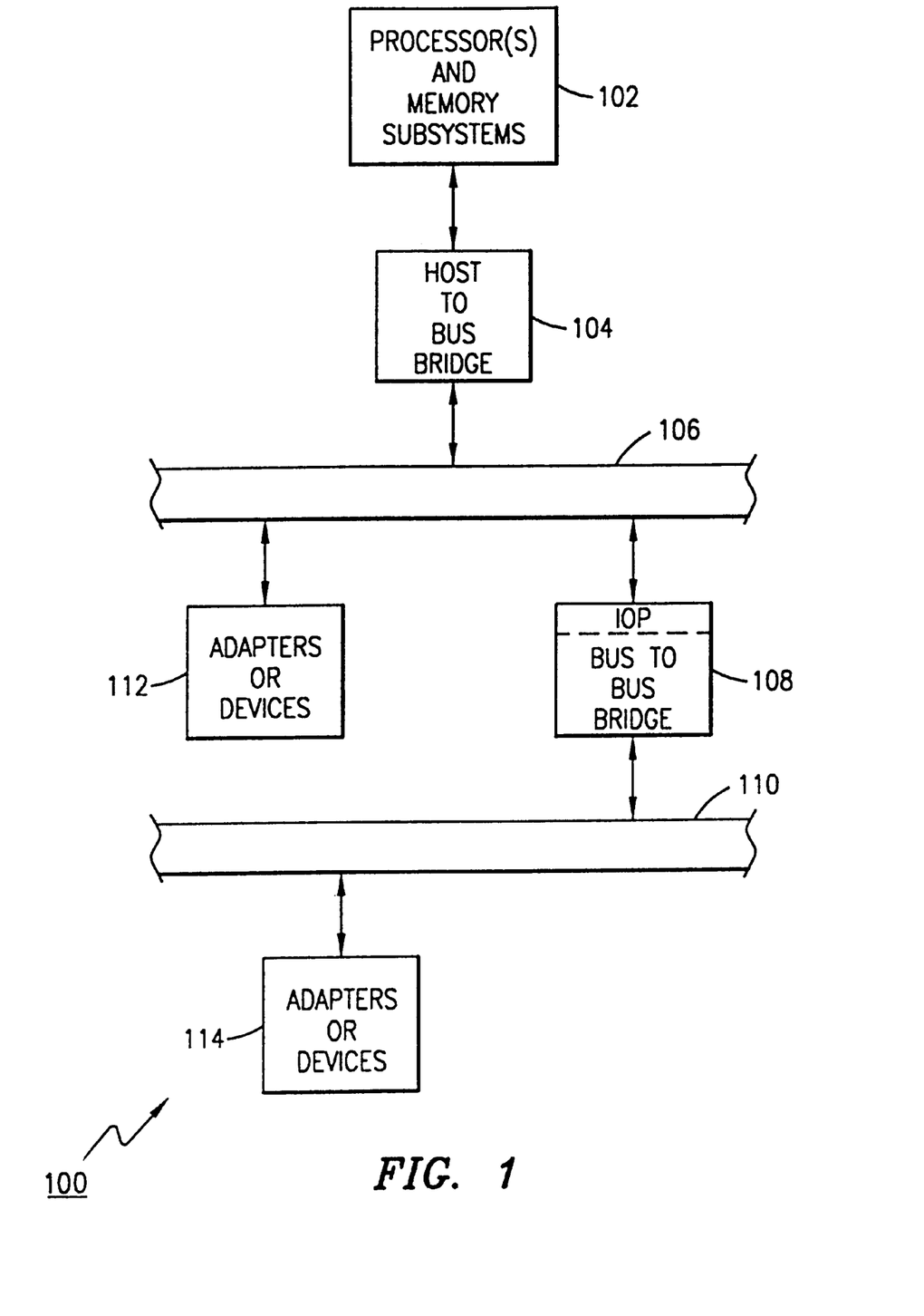
FIG. 1 is a block diagram of an exemplary embodiment of a computer system wherein the teachings of the present invention may be advantageously employed.

Referring now to the drawings wherein like or similar elements are designated with identical reference numerals throughout the several views, and wherein the various elements depicted are not necessarily drawn to scale, and, in particular to FIG. 1, a block diagram of an exemplary embodiment of a computer system 100 is depicted wherein the teachings of the present invention may be advantageously employed. The computer system 100 comprises a processor and memory subsystem 102 which in turn may include one or more host processors or CPUs and one or more memories with memory controller(s), all of which components may be disposed on a host bus. A host-to-bus bridge 104 is disposed between a first input/output (I/O) bus 106 and the host bus of the subsystem 102 for providing a communication pathway therebetween. A bus-to-bus bridge 108 is disposed between the first I/O bus and a second I/O bus 110. The first I/O bus 106 may be referred to as the primary I/O bus whereas the second I/O bus 110 may be referred to as the secondary bus. As can be seen in this exemplary embodiment, one or more adapters or peripherals are coupled to each of the first and second buses 106, 110 at corresponding slots or locations (not shown).

Continuing to refer to FIG. 1, the bus-to-bus bridge 108 may-also embody a processing unit (i.e, IOP) for the purpose of providing I$_2$O capability such that it may control I/O transactions related to the various adapters shown herein. Also, in a further aspect, the IOP may be a separate entity disposed anywhere on one or both of the two I/O buses depicted. Typically, as is understood by those skilled in the art, one IOP is responsible for the I/O bus to which it is coupled.

As has been mentioned hereinabove, in order for the IOP to control an adapter, two requirements need to be met. First, the adapter must be assigned to the IOP. Second, the IOP must contain an HDM/DDM for the assigned adapter device. If both of these conditions are met, then the adapter is under IOP control. For each adapter that is "known" or enumerated by the IOP, the IOP maintains the status or state thereof in a portion (called AdapterState) of the Hardware Resource Table (HRT).

Figure 3:
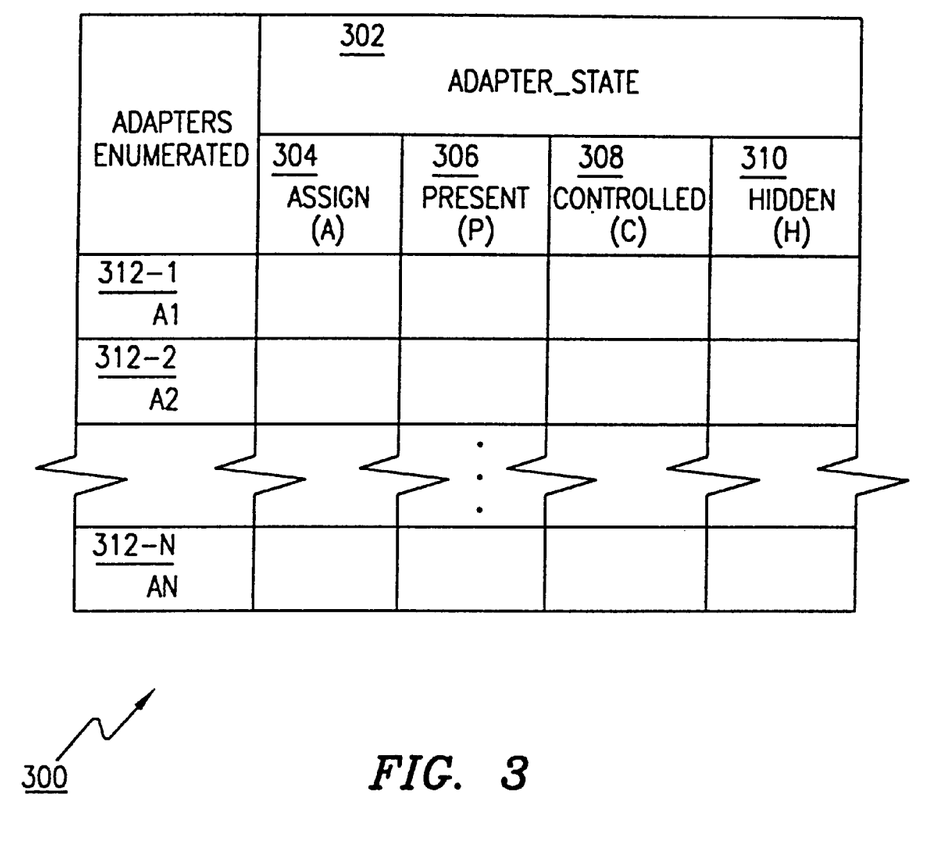
FIG. 3 depicts an exemplary embodiment of a portion of a Hardware Resource Table provided in accordance with the teachings of the present invention.

Referring now to FIG. 3, an exemplary embodiment of an IOP's Hardware Resource Table 300 is depicted. The non-volatile HRT 300 comprises an AdapterState field 302 which, in turn, includes four state bits: Assigned (A) 304, Present (P) 306, Controlled (C) 308 and Hidden (H) 310. Of these four state bits, which are communicated to the host through the AdapterState field, the host can exert direct control over only the Assigned (A) 304 bit. For each of the enumerated adapter device or its location, for example A1 through AN, labeled as 312-1 through 312-N, respectively, the AdapterState field 302 thus contains pertinent state information.

In accordance with the teachings of the present invention, the four state bits represent the following. The Assigned (A) 304 bit means that the slot or location is assigned to the IOP and if an adapter is detected at that location, it may be controllable by that IOP. The Present (P) 306 bit means that the IOP detected an adapter device at the selected location. The Controlled (C) 308 bit means that a suitable HDM/DDM is attached to the adapter device and accordingly, it is under the control of the IOP. Finally, the Hidden (H) 310 bit means that the adapter device is rendered invisible to the host such that the configuration space of that location or adapter is hidden from the host software. The plug-and-play methodology for assigning and controlling the adapters in accordance with the teachings of the present invention will be described hereinbelow in particular reference to FIGS. 4 and 5 in conjunction herewith.

Figure 2:
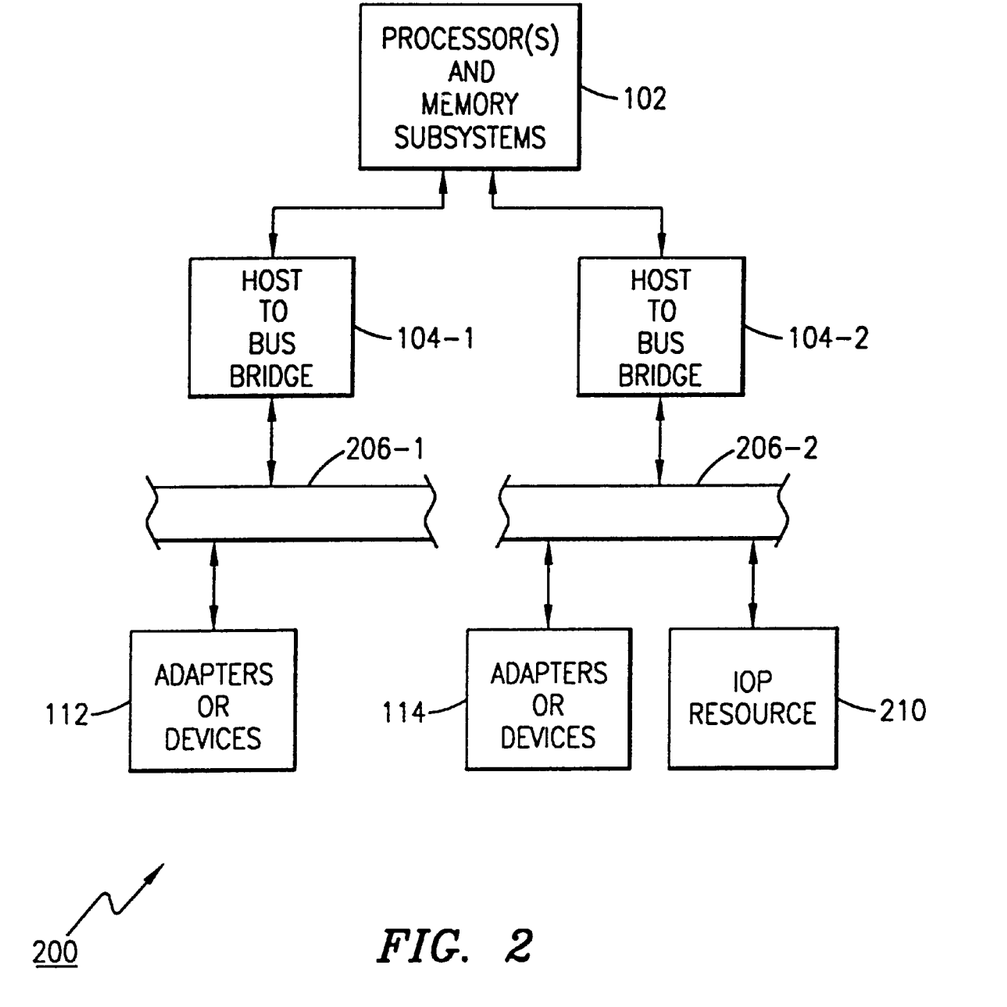
FIG. 2 is a block diagram of another exemplary embodiment of a computer system wherein the teachings of the present invention may be advantageously employed.

Referring now to FIG. 2, a block diagram of another exemplary embodiment of a computer system 200 is depicted wherein the teachings of the present invention may be advantageously utilized. It can be seen that the computer system 200 is somewhat similar to the computer system 100 described in reference to FIG. 1. One of the salient differences between these two embodiments is that the two I/O buses are provided in a peer-level arrangement such that each peer-level bus 206-1 or 206-2 is bridged to the processor/memory subsystem 102 through a separate host-to-bus bridge 104-1 or 104-2, respectively. It should be understood that the adapters/slots on either one or both of the I/O buses 206-1, 206-2 may be controlled by a suitable IOP (for example, IOP 210) in order to comport with the I$_2$O functional requirements.

Figure 4:
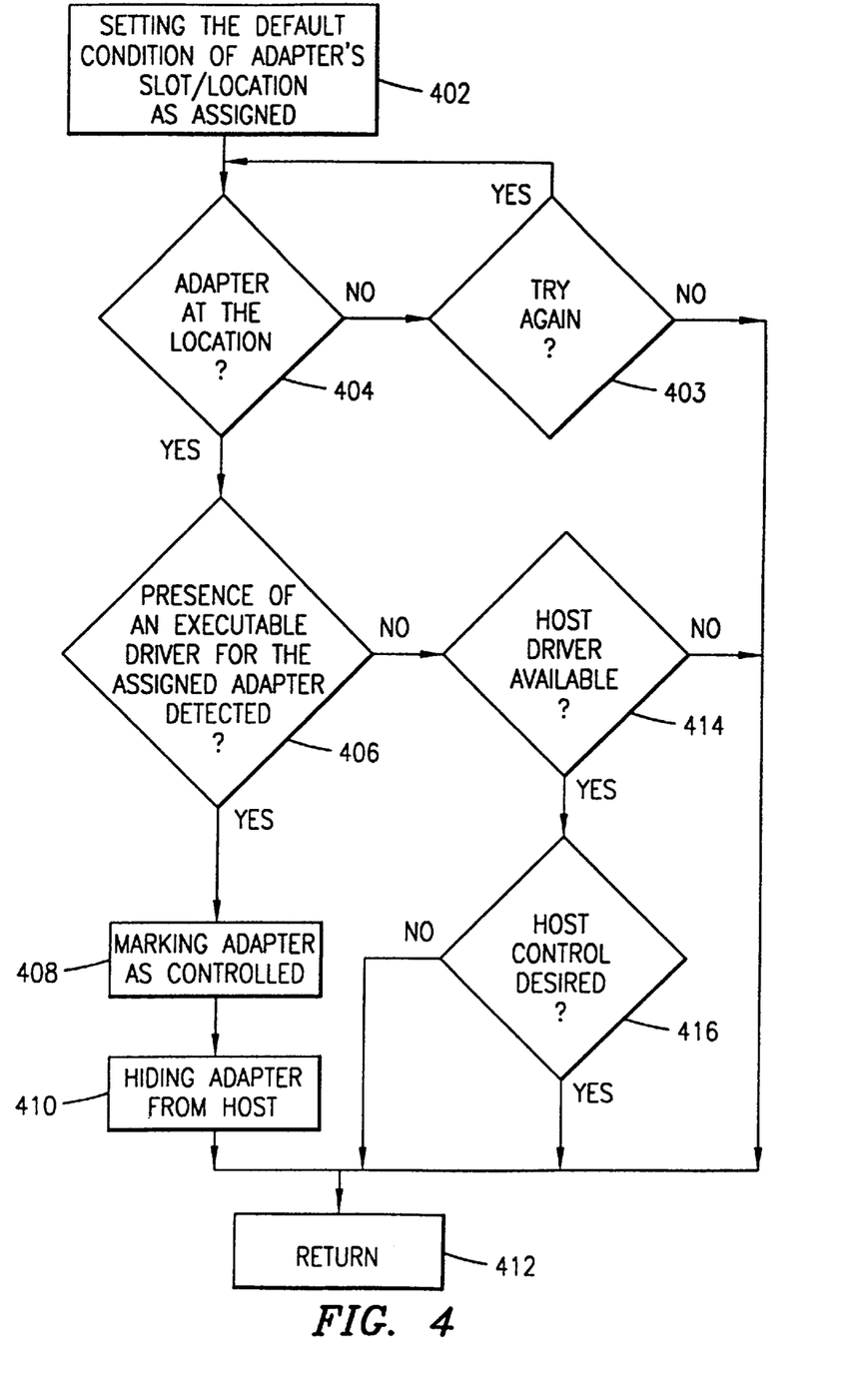
FIG. 4 depicts a flow chart of an exemplary methodology for providing for the control of adapters in accordance with the teachings of the present invention.

Referring now to FIG. 4, depicted therein is a flow chart of an exemplary methodology for providing for the control of adapters in accordance with the teachings of the present invention. Upon system initialization, the slots/locations disposed on an I/O bus (for example, the slots located in front of the IOP) are defaulted to the Assigned condition (step 402). The Assigned status indicates that the slot is assigned to an IOP and is controllable by it. In accordance with the teachings of the present invention, interrupts from the assigned slot are preferably not routed to the IOP. And, nor are there any changes in the hardware of the system that may be necessitated in a conventional system when adapters therein are defaulted to the "assigned" state. A switch means available with the iRTOS for the IOP will be, thus, set to automatically claim all slots or locations on a bus segment, preferably disposed in front the IOP. If the slot is already occupied by an adapter device, then, it can be appreciated that step 402 (slot's default assignment) and step 404 (adapter detection) may essentially be combined into a single operation, by treating the slot and the adapter thereat somewhat interchangeably. Further, if there is no adapter found (step 404), the detection step may be repeated (step 403) or a suitable mechanism may be provided so that the flow control is returned (step 412). Once an adapter is detected at the assigned location (step 404), however, that adapter device will be treated as an assigned device.

Subsequently, the Assigned status bit will be manipulated in the AdapterState field of the IOP's HRT, signifying that the assigned slot or adapter will be automatically controlled by the IOP when a suitable driver is found. If an IOP executable driver module (i.e., an HDM or DDM) is downloaded for the assigned adapter and is detected to be present, that assigned adapter will be marked as Controlled, signifying that the adapter is to be controlled by the IOP (step 408). Further, the controlled adapter will be rendered Hidden from the host software in any known manner.

If there was no suitable IOP executable driver module for the assigned adapter, then, optionally, a determination may be made if there is an appropriate host driver module available therefor (step 414). If there is no host driver module for that adapter, then the flow control is simply returned (step 412). A further determination may be made after finding the host driver as to whether host control of the adapter is desired even though it has been marked as Assigned (step 416). If so, host control of the adapter may be effectuated by known methodologies and the flow control is returned again. In some alternative embodiments, the system configuration software may be explicitly invoked so that it can release or unassign the adapter by a suitable message to the IOP (for example, the ExecAdapterRelease message) prior to the establishment of the host control.

It can be appreciated that the non-volatile HRT functions will operate normally without any interruption or interference in the exemplary methodology of the present invention. If the system configuration software wishes to override the automatic control of a particular adapter, it may be done through a suitable mechanism (for example, by invoking the ExecAdapterRelease message). Subsequently, the adapter will be forced to an Unassigned state and, consequently, to the Uncontrolled and Unhidden states. Typically, an adapter that is in the Unassigned state will not be controlled, regardless of the presence of a controlling DDM.

Figure 5:
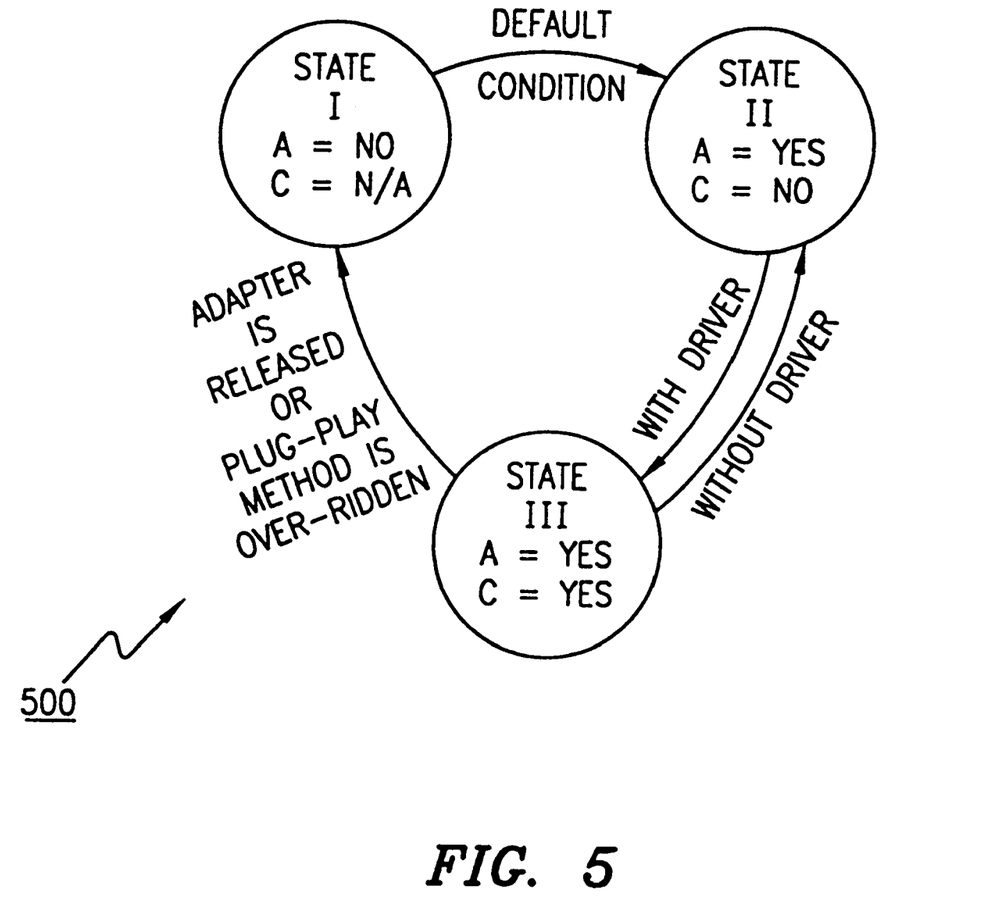
FIG. 5 depicts a state diagram provided in accordance with the teachings of the present invention.

Referring now to FIG. 5, a state diagram 500 summarizes the adapter control behavior described in the foregoing. In State I, the Assigned bit is marked as NO and the Controlled bit, accordingly, is treated essentially as immaterial. Subsequent to the default assignment condition in accordance with the teachings of the present invention, the Assigned bit of the HRT is marked YES, and the control behavior enters State II. The Controlled bit may now be marked as NO, indicating that although the slot or location is available for IOP control and is controllable, it is not yet in the Controlled state. Once an appropriate driver module for the adapter device is detected or downloaded, the control behavior enters State III whereupon both the Assigned and Controlled bits are marked as YES, signifying that the adapter device is now ready to be controlled by the IOP without any intervention or action from the host.

The adapter control behavior may eventually take one of the two paths from State III, depending upon certain conditions. If the adapter is released from the IOP control (or, when the plug-and-play methodology as described herein is expressly over-ridden after entering State III, for example), the behavior may be forced to State I. On the other hand, it may go back to State II if the driver module is unloaded or removed from the system.

Based upon the foregoing Detailed Description, it should now be apparent to those of ordinary skill in the art that the present invention provides a simple yet efficient system and method for providing a plug-and-play control methodology for assigning and controlling adapters in an $I_2O$ environment. The present invention overcomes the shortcomings and deficiencies of the current technologies in that the devices that need to be controlled are not required to be located behind a PCI-to-PCI bridge on a secondary I/O bus. Nor the use a particular I/O processor (e.g., i960® processor) is required. The present invention can be practiced with any generic processor that complies with the $I_2O$ Specification for the purpose of controlling I/O transactions. It may be understood upon reference to the teachings herein that one of the host processors in a multi-processor environment may also be used for this purpose. Moreover, the present invention eliminates cumbersome steps (for example, host-initiated adapter controllability determinations) in current adapter assignment and control methodologies.

Although only certain embodiments of the apparatus of the present invention have been illustrated in the accompanying Drawings and described in the foregoing Detailed Description, it will be understood that the invention is not limited to the embodiments disclosed, but is capable of additional rearrangements, modifications and substitutions without departing from the spirit of the invention as set forth and defined by the following claims. Accordingly, it should be understood that the scope of the present invention encompasses all such arrangements and is solely limited by the claims as follows.

What is claimed is:

1. A method for managing one or more adapters in a computer system comprising a host processor and an Input/Output Processor (IOP), comprising the steps of:

defaulting to a condition, upon system initialization, wherein a selected one of said one or more adapters is treated as "assigned" and wherein the computer system is not configured to route interrupts from the selected adapter to the IOP;

detecting the presence of an executable driver object associated with the selected adapter; and marking the selected adapter as "controlled," based on the detecting step, such that the selected adapter is controlled by the IOP, wherein the computer system is configured to route interrupts from the selected adapter to the IOP.

2. The method as set forth in claim 1, wherein the selected adapter is hidden from the host processor.

3. The method as set forth in claim 1, wherein the selected adapter is disposed on a bus segment located in front of the IOP.

4. The method as set forth in claim 1, wherein the selected adapter is disposed on a bus segment located behind the IOP.

5. The method as set forth in claim 1, wherein the selected adapter comprises an adapter located on a peer-level I/O bus.

6. The method as set forth in claim 1, wherein the step of defaulting comprises the step of setting a marker associated with the selected adapter to indicate that it is "assigned."

7. A system for managing one or more adapters in a computer having a host processor and an Input/Output Processor (IOP), comprising:

means for defaulting to an "assigned" condition pertaining to a selected one of the one or more adapters without routing interrupts from the selected one of the one or more adapters to the IOP;

nonvolatile means for storing a plurality of conditions associated with the one or more adapters, the plurality of conditions comprising the "assigned" condition, which condition is identified by the contents of a portion of the nonvolatile means;

detecting means for detecting the presence of an executable driver object associated with the adapter; and means for marking the selected adapter as "controlled" when the executable driver object is detected, such that the selected adapter is controlled by the IOP and for routing interrupts from the selected adapter to the IOP.

8. The system as set forth in claim 7, wherein the selected adapter is disposed on a bus segment located in front of the IOP.

9. The system as set forth in claim 7, wherein the selected adapter is disposed on a bus segment located behind the IOP.

10. The system as set forth in claim 7, wherein the selected adapter comprises an adapter located on a peer-level I/O bus.

11. A plug-and-play method for assigning and controlling one or more adapters in a computer system, which computer system includes a host processor, an IOP, and an I/O bus associated with one or more slots, the slots being associated with the adapters, the method comprising:

defaulting to an "assigned" condition with respect to the one or more slots upon system initialization;

determining if there is an adapter located at a selected one of the one or more slots;

determining if a driver module is available for the adapter, the driver module adapted to be executable on the IOP;

marking the adapter as "controlled" if the driver module is determined to be available; and configuring the computer system such that interrupts associated with the adapter are routed to the IOP.

12. The method as set forth in claim 11, wherein the selected adapter is hidden from the host processor.

13. The method as set forth in claim 11, wherein the I/O bus comprises a primary-side I/O bus and the selected slot comprises a primary-side slot.

14. The method as set forth in claim 11, wherein the I/O bus comprises a secondary-side I/O bus and the selected slot comprises a secondary-side slot.

15. The method as set forth in claim 11, wherein the I/O bus comprises a peer-level I/O bus and the selected slot comprises a peer-level slot.

16. A method for managing an adapter in a computer system comprising a host processor and Input/Output Processor (IOP), comprising the acts of:

(a) assigning the adapter to the IOP without routing interrupts from the adapter to the IOP or to the host processor;

(b) determining whether the IOP comprises an executable driver associated with the adapter; and (c) if the IOP comprises an executable driver associated with the adapter, routing interrupts from the adapter to the IOP.

17. The method of claim 16, wherein act (a) comprises the step of marking in memory that the adapter is assigned.

18. The method of claim 16, comprising the act of:

if the IOP does not comprise an executable driver associated with the adapter, the adapter is placed in an unassigned state.

19. The method of claim 18, comprising the act of:

if the host processor comprises an executable driver associated with the adapter, routing interrupts from the adapter to the host processor.

20. The method of claim 16, wherein if the IOP comprises an executable driver associated with the adapter, the adapter is hidden from the host processor.

21. A system for configuring an adapter in a computer having a host processor and an Input/Output Processor (IOP), the IOP having memory, comprising:

an operating system stored in the memory; and status information stored in the IOP and readable by the host processor, wherein upon initialization of the computer, the operating system sets the status information to read that the adapter is assigned to the IOP if in the memory there exists a driver module associated with the adapter and to read that the adapter is not assigned to the IOP if in the memory there does not exist a driver module associated with the adapter.

22. The system of claim 21, wherein the operating system configures the computer to route interrupts from the adapter to the IOP if in the memory there exists a driver module associated with the adapter.

23. The system of claim 21, wherein the operating system configures the computer to route interrupts from the adapter to the host if in the memory there does not exist a driver module associated with the adapter.

24. The system of claim 21, wherein the memory comprises non-volatile memory.

* * * * *